US011432139B2

United States Patent
Goldfarb

(10) Patent No.: US 11,432,139 B2
(45) Date of Patent: *Aug. 30, 2022

(54) SYSTEM AND METHOD FOR COMBINED NETWORK-SIDE AND OFF-AIR MONITORING OF WIRELESS NETWORKS

(71) Applicant: Verint Systems Ltd., Herzliya Pituach (IL)

(72) Inventor: Eithan Goldfarb, Ness Ziona (IL)

(73) Assignee: COGNYTE TECHNOLOGIES ISRAEL LTD., Herzliya, Pituach (IL)

( * ) Notice: Subject to any disclaimer, the term of this patent is extended or adjusted under 35 U.S.C. 154(b) by 92 days.

This patent is subject to a terminal disclaimer.

(21) Appl. No.: 16/703,241

(22) Filed: Dec. 4, 2019

(65) Prior Publication Data

US 2020/0107195 A1    Apr. 2, 2020

Related U.S. Application Data

(63) Continuation of application No. 15/008,375, filed on Jan. 27, 2016, now Pat. No. 10,560,842.

(30) Foreign Application Priority Data

Jan. 28, 2015 (IL) .......................................... 236968

(51) Int. Cl.
  *H04L 29/06*     (2006.01)
  *H04W 12/033*    (2021.01)
  (Continued)

(52) U.S. Cl.
  CPC ....... *H04W 12/033* (2021.01); *H04W 12/069* (2021.01); *H04W 24/08* (2013.01)

(58) Field of Classification Search
  CPC .. H04W 12/033; H04W 12/069; H04W 24/08
  See application file for complete search history.

(56) References Cited

U.S. PATENT DOCUMENTS 5,689,442 A    11/1997 Swanson et al.
6,404,857 B1   6/2002 Blair et al.
(Continued)

FOREIGN PATENT DOCUMENTS

WO    2010/116292    10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
(Continued)

*Primary Examiner* — Joseph P Hirl
*Assistant Examiner* — Chi D Nguy
(74) *Attorney, Agent, or Firm* — ISUS Intellectual Property PLLC; Anthony Jason Mirabito

(57) ABSTRACT

A monitoring system monitors authentication sessions both on the air interface between the terminals and the network, and on at least one wired network-side interface between network-side elements of the network. The monitoring system constructs a database of sets of network-side authentication parameters using network-side monitoring. Each set of network-side authentication parameters originates from a respective authentication session and is associated with the International Mobile Station Identity (IMSI) of the terminal involved in the session. In order to start decrypting the traffic of a given terminal, the system obtains the off-air authentication parameters of that terminal using off-air monitoring, and finds an entry in the database that matches the air-interface authentication parameters. From the combination of correlated network-side and off-air authentication parameters, the processor is able to extract the parameters needed for decryption.

18 Claims, 3 Drawing Sheets

(51) Int. Cl.
H04W 12/069 (2021.01)
H04W 24/08 (2009.01)

(56) References Cited

U.S. PATENT DOCUMENTS

| | | | |
|---|---|---|---|
| 6,718,023 B1 | 4/2004 | Zolotov |
| 6,741,992 B1 | 5/2004 | McFadden |
| 6,757,361 B2 | 6/2004 | Blair et al. |
| 6,950,521 B1 | 9/2005 | Marcovici et al. |
| 7,134,141 B2 | 11/2006 | Crosbie |
| 7,216,162 B2 | 5/2007 | Amit et al. |
| 7,225,343 B1 | 5/2007 | Honig et al. |
| 7,269,157 B2 | 9/2007 | Klinker et al. |
| 7,287,278 B2 | 10/2007 | Liang |
| 7,374,096 B2 | 5/2008 | Overhultz et al. |
| 7,466,816 B2 | 12/2008 | Blair |
| RE40,634 E | 2/2009 | Blair et al. |
| 7,587,041 B2 | 9/2009 | Blair |
| 7,769,875 B1 | 8/2010 | Moisand et al. |
| RE43,103 E | 1/2012 | Rozman et al. |
| 8,176,527 B1 | 5/2012 | Njemanze et al. |
| 8,201,245 B2 | 6/2012 | Dewey et al. |
| RE43,528 E | 7/2012 | Rozman et al. |
| RE43,529 E | 7/2012 | Rozman et al. |
| 8,215,546 B2 | 7/2012 | Lin et al. |
| 8,224,761 B1 | 7/2012 | Rockwood |
| 8,351,900 B2 | 1/2013 | Lotvonen et al. |
| RE43,987 E | 2/2013 | Rozman et al. |
| 8,402,543 B1 | 3/2013 | Ranjan et al. |
| 8,413,244 B1 | 4/2013 | Nachenberg |
| 8,496,169 B2 | 7/2013 | Christofferson |
| 8,499,348 B1 | 7/2013 | Rubin |
| 8,578,493 B1 | 11/2013 | McFadden |
| 8,682,812 B1 | 3/2014 | Ranjan |
| 8,762,948 B1 | 6/2014 | Zaitsev |
| 8,838,951 B1 | 9/2014 | Hicks et al. |
| 8,839,417 B1 | 9/2014 | Jordan |
| 8,850,579 B1 | 9/2014 | Kalinichenko |
| 8,869,268 B1 | 10/2014 | Barger |
| 9,385,865 B2 | 7/2016 | Wix et al. |
| 10,609,635 B2* | 3/2020 | Ravishankar ......... H04W 60/00 |
| 11,284,288 B2* | 3/2022 | Yavuz ................... H04W 28/10 |
| 2002/0129140 A1 | 9/2002 | Peled et al. |
| 2003/0031322 A1 | 2/2003 | Beckmann et al. |
| 2003/0097439 A1 | 5/2003 | Strayer et al. |
| 2005/0018618 A1 | 1/2005 | Mualem et al. |
| 2005/0108377 A1 | 5/2005 | Lee et al. |
| 2005/0202815 A1 | 9/2005 | Verma et al. |
| 2006/0026680 A1 | 2/2006 | Zakas |
| 2006/0253703 A1 | 11/2006 | Eronen et al. |
| 2006/0262742 A1* | 11/2006 | Dommaraju ......... H04W 12/02 370/401 |
| 2007/0180509 A1 | 8/2007 | Swartz et al. |
| 2007/0186284 A1 | 8/2007 | McConnell |
| 2007/0192863 A1 | 8/2007 | Kapoor et al. |
| 2007/0294768 A1 | 12/2007 | Moskovitch et al. |
| 2008/0014873 A1 | 1/2008 | Krayer et al. |
| 2008/0028463 A1 | 1/2008 | Dagon et al. |
| 2008/0141376 A1 | 6/2008 | Clausen et al. |
| 2008/0150698 A1 | 6/2008 | Smith et al. |
| 2008/0184371 A1 | 7/2008 | Moskovitch et al. |
| 2008/0196104 A1 | 8/2008 | Tuvell et al. |
| 2008/0261192 A1 | 10/2008 | Huang et al. |
| 2008/0285464 A1 | 11/2008 | Katzir |
| 2009/0036143 A1 | 2/2009 | Martin et al. |
| 2009/0106842 A1 | 4/2009 | Durie |
| 2009/0122762 A1 | 5/2009 | Kitazoe et al. |
| 2009/0150999 A1 | 6/2009 | Dewey et al. |
| 2009/0158430 A1 | 6/2009 | Borders |
| 2009/0172397 A1 | 7/2009 | Kim |
| 2009/0216760 A1 | 8/2009 | Bennett |
| 2009/0249484 A1 | 10/2009 | Howard et al. |
| 2009/0267730 A1 | 10/2009 | Zhang |
| 2009/0282476 A1 | 11/2009 | Nachenberg et al. |
| 2010/0037314 A1 | 2/2010 | Perdisci |
| 2010/0071065 A1 | 3/2010 | Khan et al. |
| 2010/0100949 A1 | 4/2010 | Sonwane |
| 2010/0124196 A1 | 5/2010 | Bonar et al. |
| 2011/0080267 A1 | 4/2011 | Clare et al. |
| 2011/0099620 A1 | 4/2011 | Stavrou et al. |
| 2011/0150211 A1 | 6/2011 | Anderson |
| 2011/0154497 A1 | 6/2011 | Bailey |
| 2011/0167494 A1 | 7/2011 | Bowen et al. |
| 2011/0271341 A1 | 11/2011 | Satish et al. |
| 2011/0302653 A1 | 12/2011 | Frantz et al. |
| 2011/0320816 A1 | 12/2011 | Yao et al. |
| 2012/0017281 A1 | 1/2012 | Banerjee |
| 2012/0167221 A1 | 6/2012 | Kang et al. |
| 2012/0174225 A1 | 7/2012 | Shyamsunder et al. |
| 2012/0222117 A1 | 8/2012 | Wong et al. |
| 2012/0256730 A1 | 10/2012 | Scott et al. |
| 2012/0304244 A1 | 11/2012 | Xie et al. |
| 2012/0308009 A1 | 12/2012 | Venkatsuresh et al. |
| 2012/0311708 A1 | 12/2012 | Agarwal et al. |
| 2012/0327956 A1 | 12/2012 | Vasudevan |
| 2013/0014253 A1 | 1/2013 | Neou |
| 2013/0333038 A1 | 12/2013 | Chien |
| 2014/0075557 A1 | 3/2014 | Balabine et al. |
| 2014/0098797 A1 | 4/2014 | Kanamarlapudi et al. |
| 2014/0148196 A1 | 5/2014 | Bassan-Eskenazi et al. |
| 2014/0160955 A1 | 6/2014 | Lum et al. |
| 2014/0207917 A1 | 7/2014 | Tock et al. |
| 2014/0298469 A1 | 10/2014 | Marion et al. |
| 2015/0019746 A1* | 1/2015 | Shatzkamer ......... H04W 76/10 709/228 |
| 2015/0023504 A1 | 1/2015 | Wix et al. |
| 2015/0135265 A1 | 5/2015 | Bagrin |
| 2015/0135326 A1 | 5/2015 | Bailey, Jr. |
| 2015/0140097 A1 | 5/2015 | Goldfarb |
| 2015/0161518 A1* | 6/2015 | McCann ................. G06N 7/005 706/12 |
| 2015/0180658 A1 | 6/2015 | Korenfeld et al. |
| 2016/0050562 A1 | 2/2016 | Pudney et al. |
| 2016/0182460 A1 | 6/2016 | Alexander et al. |
| 2017/0013121 A1 | 1/2017 | Baeder et al. |
| 2017/0310486 A1 | 10/2017 | Goldfarb |

OTHER PUBLICATIONS

Aho, Alfred V., et al., "Efficient String Matching: An Aid to Bibliographic Search," Communication of the ACM, Jun. 1975, vol. 18, No. 6, pp. 333-340.
Altshuler, Y., et al., "How Many Makes a Crowd? On the Evolution of Learning as a Factor of Community Coverage," LNCS 7227, 2012, pp. 43-52.
Altshuler, Y., et al., "Incremental Learning with Accuracy Prediction of Social and Individual Properties from Mobile-Phone Data," IEEE, 2011, 10 pages.
Altshuler, Y., et al., "Trade-Offs in Social and Behavioral Modeling in Mobile Networks," LNCS 7812, 2013, pp. 412-423.
Argamon, S., et al., "Automatically Profiling the Author of an Anonymous Text," Communication of the ACM, vol. 52, No. 2, Feb. 2009, pp. 119-123.
Argamon, S., et al., "Gender, Genre, and Writing Style in Formal Written Texts," Text & Talk, vol. 23, Issue 3, 2003, 32 pages.
Asokan, N., et al., "Man-in-the-Middle in Tunneled Authentication Protocols," Draft version 1.3 (latest public version: http://eprint.iacr.org/2002/163/, Nov. 11, 2002, 15 pages.
Atkinson, M., et al., "Near Real Time Information Mining in Multilingual News," World Wide Web Conference, Apr. 20-24, 2009, 2 pages.
Bailey, M., et al., "Automated Classification and Analysis of Internet Malware," RAID, 2007, pp. 178-197.
Barkan, E.P., "Cryptanalysis of Ciphers and Protocols," Research Thesis submitted to the Senate of the Technion, Israel Institute of Technology, 2006, 200 pages.
Bayer, U., et al., Scalable, Behavior-Based Malware Clustering, Secure Systems Lab, Technical University, Vienna, 2009, 18 pages.
Bilge, Leyla, et al., "Exposure: Finding Malicious Domains Using Passive DNS Analysis," Feb. 2011, 17 pages.

(56) References Cited

OTHER PUBLICATIONS

"Cell Scanning and Catcher Detection in unnoticeable pocket size," NetHawk C2, Data sheet, version 1.4, EXFO, 2010, 4 pages.

Cellusys, "SS7 Vulnerabilities," e-book, 2016, 53 pages.

Cloudshield, Inc., "Lawful Intercept Next-Generation Platform," 2009, 6 pages.

Coffman, T., et al., "Graph-Based Technologies for Intelligence Analysis," CACM, Mar. 2004, 12 pages.

Corney, M., et al. "Gender-Preferential Text Mining of E-mail Discourse," Proceedings of the 18the Annual Computer Security Applications Conference, 2002, 8 pages.

De Vel, O., et al., "Language and Gender Author Cohort Analysis of E-mail for Computer Forensics," Defence Science and Technology Organisation, Australia, 2002, 16 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Dietrich, C.J., et al., "CoCoSpot: Clustering and recognizing botnet command and control channels using traffic analysis," 2012, pp. 475-486.

Eagle, N., et al., "Inferring friendship network structure by using mobile phone data," PNAS, vol. 106, No. 36, 2009, pp. 15274-15278.

Engel, T., "SS7: Locate. Track. Manipulate." 2014, 55 pages.

Eslahi, M., "botAnalytics: Improving HTTP-Based Botnet Detection by Using Network Behavior Analysis system," Dissertation, Faculty of Computer Science and Information Technology, University of Malaya, 2010, 124 pages.

Estival, D., et al., "Author Profiling for English Emails," Proceedings of the $10^{th}$ Conference of the Pacific Association for Computational Linguistics, 2007, pp. 263-272.

Fisk, Mike, et al., "Applying Fast String Matching to Intrusion Detection," Los Alamos National Laboratory and University of California San Diego, Jun. 1975, 22 pages.

FoxReplay Analyst, Fox Replay BV, http//www.foxreplay.com, Revision 1.0, Nov. 2007, 5 pages.

FoxReplay Analyst Product Brochure, Fox-IT BV, http//www.foxreplay.com, 2006, 2 pages.

Girardin, F., et al., "Detecting air travel to survey passengers on a worldwide scale," Journal of Location Based Services, 2010, 26 pages.

Goldfarb, Eithan, "Mass Link Analysis: Conceptual Analysis," Jun. 24, 2007, Version 1.1, 21 pages.

Goswami, S., et al., "Stylometric Analysis of Bloggers' Age and Gender," Proceedings of the Third International ICWSM Conference, 2009, pp. 214-217.

Gu, G., et al., "BotMiner: Clustering Analysis of Network Traffic for Protocol- and Structure-Independent Botnet Detection," USENIX Security Symposium, vol. 5, No. 2, XP61009228, 2008, 16 pages.

Gu, G., et al., "BotSniffer: Detecting Botnet Command and Control Channels in Network Traffic," Proceedings of the $15^{th}$ Annual Network and Distributed System Security Symposium (NDSS'08), San Diego, California, 2008, 18 pages.

Kostrzewa, A., "Development of a man in the middle attack on the GSM Um-Interface," Master Thesis, 2011, 88 pages.

Jacob, G., et al., "Jackstraws: Picking Command and Control Connections from Bot Traffic," Proceedings of the $20^{th}$ Usenix Security Symposium, San Francisco, 2011, 16 pages.

Lakhina, A., et al., "Mining Anomalies Using Traffic Feature Distributions," SIGCOMM, 2005, pp. 217-228.

Livadas, C., et al., "Using Machine Learning Techniques to Identify Botnet Traffic," In $2^{nd}$ IEEE LCN Workshop on Network Security (WoNS'2006), 2006, pp. 967-974.

Meyer, U., et al., "On the Impact of GSM Encryption and Man-in-the-Middle Attacks on the Security of Interoperating GSM/UMTS Networks," proceedings of the $15^{th}$ IEEE International Symposium on Personal, Indoor and Mobile Radio Communications, 2004, pp. 2876-2883.

Mohrehkesh, S., et al., "Demographic Prediction of Mobile User from Phone Usage," Proceedings Mobile Data Challenge by Nokia Workshop, Newcastle, United Kingdom, 2012, 4 pages.

Mourad, H., "The Fall of SS7—How Can the Critical Security Controls Help?" The SANS Institute, 2015, 29 pages.

Navarro, Gonzalo, et al., "Flexible Pattern Matching in Strings: Practical On-Line Search Algorithms for Texts and Biological Sequences," Cambridge University Press, 2002, 166 pages.

Netronome SSL Inspector Solution Overview White Paper, "Examining SSL-encrypted Communications," 2010, 8 pages.

Nohl, K., "Mobile self-defense," Security Research Labs, 2015, 24 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Radiator, EAP-SIM, EAP-AKA and EAP-AKA' Support, White Paper, Open System Consultants Pty. Ltd., 2014, 17 pages.

Rangel, F., et al., "Overview of the Author Profiling Task at PAN 2013," CLEF 2013 Evaluation Labs, 2013, 13 pages.

Rieck, K., et al., "Botzilla: Detecting the 'Phoning Home' of Malicious Software," Proceedings of the ACM Symposium on Applied Computing (SAC), Sierre, Switzerland, 2010, 7 pages.

Rohde & Schwarz GmbH & Co. KG, "Accessnet-T, DMX-500 R2, Digital Mobile eXchange," Product Brochure, Secure Communications, Mar. 2000, 4 pages.

Rohde & Schwarz GmbH & Co. KG, "Accessnet-T IP," Product Brochure, Secure Communications, Jan. 2000, 4 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "GAPM Passive GSM Test System," Technical Information, 2009, 37 pages.

Rohde & Schwarz GmbH & Co. KG, "Integrated Digital Audio Software R&S AllAudio," Specifications, 2000, 8 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S Ammos GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S Ammos GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "R&S Ramon COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Schulzrinne, H., et al., "RTP: A Transport Protocol for Real-Time Applications," Standards Track, Jul. 2003, 89 pages.

Sheng, Lei, et al., "A Graph Query Language and Its Query Processing," IEEE, Apr. 1999, pp. 572-581.

Signaling System 7 (SS7) Security Report, Positive Technologies, 2014, 15 pages.

Soghoian, Christopher, et al., "Certified Lies: Detecting and Defeating Government Interception Attacks Against SSL," 2010, 19 pages.

Stamatatos, E., "Author identification: Using text sampling to handle the class imbalance problem," Science Direct, Information Processing and Management, vol. 44, 2008, pp. 790-799.

Strobel, D., "IMSI Catcher," Seminararbeit, Ruhr-Universität Bochum, 2007, pp. 13-24.

Svenson, Pontus, et al., "Social network analysis and information fusion for anti-terrorism," CIMI, 2006, 8 pages.

(56) References Cited

OTHER PUBLICATIONS

"TEMS™ Pocket—A Complete Measurement Smartphone System in Your Hand," Ascom Network Testing, 2013, 2 pages.

Thonnard, O., et al., "Actionable Knowledge Discovery for Threats Intelligence Support Using a Multi-Dimensional Data Mining Methodolgy," 2008 IEEE International Conference on Data Mining Workshops, 2008, pp. 154-163.

Tongaonkar, Alok S., "Fast Pattern-Matching Techniques for Packet Filtering," Stony Brook University, May 2004, 44 pages.

Vedaldi, A., "An implementation of SIFT detector and descriptor," University of California at Los Angeles, 2007, 7 pages.

Verint Systems Inc., "Mass Link Analysis: Solution Description," Dec. 2008, 16 pages.

Wang, H., et al., "NetSpy: Automatic Generation of Spyware Signatures for NIDS," Proceedings of the $22^{nd}$ Annual Computer Security Applications Conference, Miami Beach, Florida, Dec. 2006, ten pages.

"Wireless Network Optimization Platform—LTE," E6474A Drive Test, JDSU, Communications Test & Measurement Solutions, 2012, 4 pages.

Yu, Fang, et al., "Fast and Memory-Efficient Regular Expression Matching for Deep Packet Inspection," ANCS'06, San Jose, California, Dec. 3-5, 2006, 10 pages.

Yu, Fang, et al., "Gigabit Rate Packet Pattern-Matching Using TCAM," Proceedings of the 12th IEEE International Conference on Network Protocols (ICNP'04), 2004, 10 pages.

\* cited by examiner

SYSTEM AND METHOD FOR COMBINED NETWORK-SIDE AND OFF-AIR MONITORING OF WIRELESS NETWORKS

CROSS-REFERENCE TO RELATED APPLICATIONS

This application is a continuation of, and claims the benefit of priority to, U.S. patent application Ser. No. 15/008,375, filed on Jan. 27, 2016, which claims the benefit of priority to Israel Patent Application No. 236968, filed on Jan. 28, 2015, the disclosure of both are incorporated herein by reference in their entirety.

FIELD OF THE DISCLOSURE

The present disclosure relates generally to network monitoring, and particularly to methods and systems for combined network-side and off-air monitoring of wireless networks.

BACKGROUND OF THE DISCLOSURE

Wireless communication networks typically support encryption of traffic, and require wireless terminals to authenticate vis-à-vis the network before they can communicate. Encryption and authentication processes are specified, for example, in Global System for Mobile communications (GSM), Universal Mobile Telecommunication System (UMTS), Long Term Evolution (LTE) and other cellular communication protocols. Both traffic encryption and authentication use cryptographic keys that are stored in the network and in the terminals.

SUMMARY OF THE DISCLOSURE

An embodiment that is described herein provides a method for network monitoring. The method includes obtaining first sets of authentication parameters exchanged between wireless communication terminals and a wireless network, by monitoring an air interface between the terminals and the wireless network, and obtaining second sets of authentication parameters exchanged between the terminals and the network, by monitoring at least one wired interface between network-side elements of the wireless network. One or more correlations are established between the first sets and the second sets, and the established correlations are acted upon.

In some embodiments, obtaining the first and second sets includes monitoring authentication sessions conducted between the terminals and a Home Location Register (HLR) of a wireless network. In an embodiment, establishing the correlations includes identifying one or more authentication parameters that appear in one of the first sets and in one of the second sets.

In some embodiments, establishing the correlations includes identifying a first set of authentication parameters obtained from the air interface and a second set of authentication parameters obtained from the wired interface that both pertain to a given terminal. In an embodiment, acting upon the correlations includes decrypting encrypted traffic exchanged with the given terminal using one or more parameters extracted from the correlated first set and second set. Decrypting the encrypted traffic may include obtaining an initial key from the parameters extracted from the correlated first set and second set, deriving one or more subsequent keys from the initial key, and decrypting the encrypted traffic using the subsequent keys.

In a disclosed embodiment, establishing the correlation includes concluding that a Temporary Mobile Station Identity (TMSI) in the first set and an International Mobile Station Identity (IMSI) in the second set both pertain to the given terminal. Acting upon the correlations may include monitoring the given terminal using the TMSI. In another embodiment, obtaining the first sets includes storing the first sets in a database, and establishing the correlations includes, for a given second set obtained from the air interface, querying the database for a first set that matches the given second set.

In yet another embodiment, establishing and acting upon the correlations include buffering traffic received over the air interface so as to produce a delayed replica and a non-delayed replica of the traffic, establishing the correlations using the non-delayed replica, and acting upon the correlations in the delayed replica. In some embodiments, the method includes decrypting encrypted traffic exchanged in a session for which a first set of authentication parameters is unavailable, by searching over at least some of the second sets and attempting to decrypt the encrypted traffic using the searched second sets.

There is additionally provided, in accordance with an embodiment that is described herein, a system for network monitoring including a first interface, a second interface and a processor. The first interface is configured to monitor an air interface between wireless communication terminals and a wireless network. The second interface is configured to monitor at least one wired interface between network-side elements of the wireless network. The processor is configured to obtain using the first interface first sets of authentication parameters exchanged between the terminals and the network, to obtain using the second interface second sets of authentication parameters exchanged between the terminals and the network, and to establish one or more correlations between the first sets and the second sets.

The present disclosure will be more fully understood from the following detailed description of the embodiments thereof, taken together with the drawings in which:

DETAILED DESCRIPTION OF EMBODIMENTS

Overview

Figure 1:
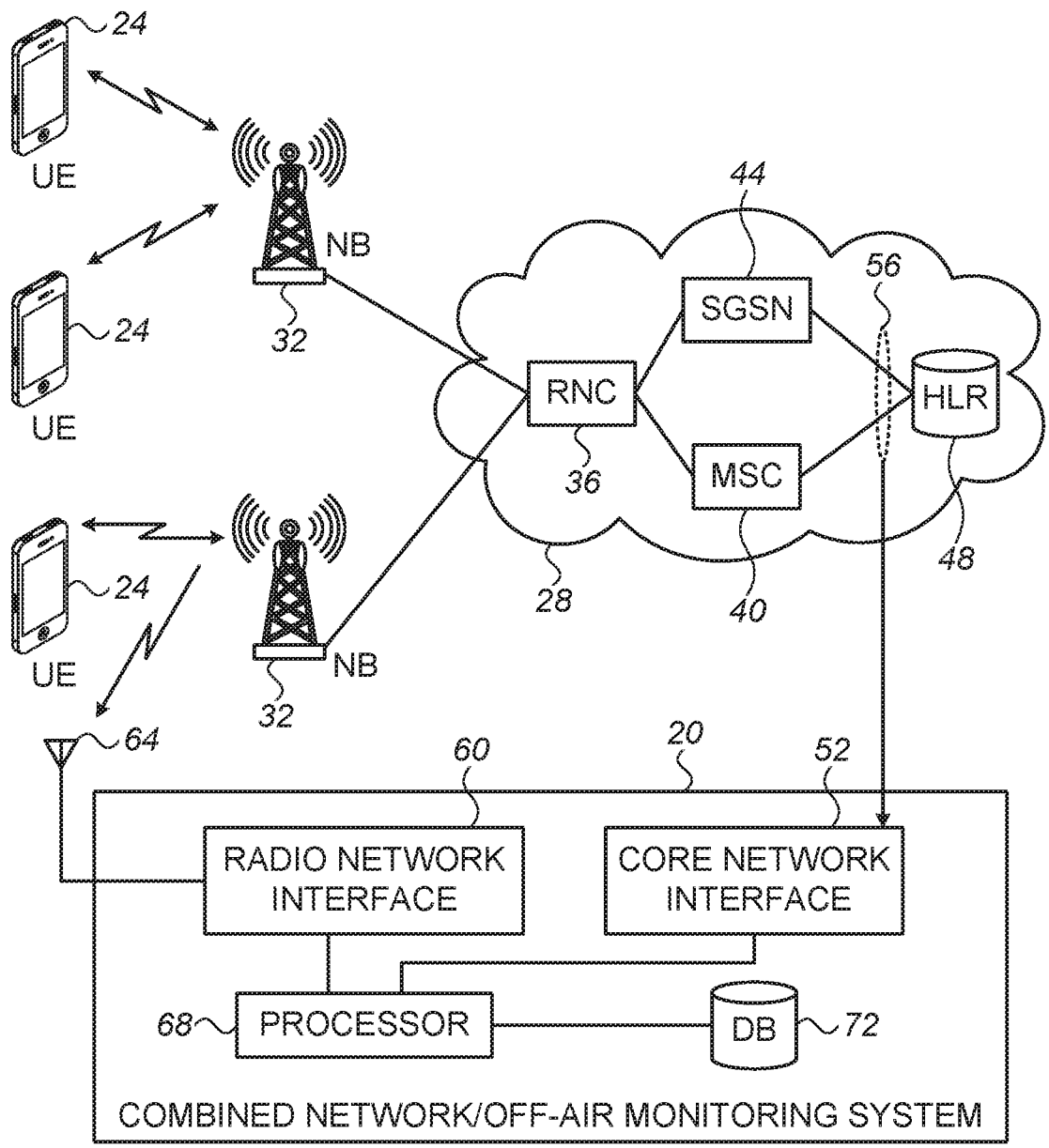
FIG. 1 is a block diagram that schematically illustrates a combined network-side and off-air monitoring system, in accordance with an embodiment that is described herein.

Embodiments that are described herein provide improved methods and systems for monitoring communication in wireless networks. The disclosed techniques use a combination of wired network-side monitoring and wireless off-air monitoring to decode encrypted traffic exchanged between wireless terminals and the network. Such techniques can be used, for example, by cellular service providers to evaluate network performance and provide selective Quality-of-Service (QoS) to users.

The reason for combining network-side and off-air monitoring is that some of the parameters needed for decryption are not transmitted over the air interface. In some embodiments, a monitoring system monitors authentication sessions both on the air interface between the terminals and the network, and on at least one wired network-side interface between network-side elements of the network. The system extracts first sets of authentication parameters (referred to herein as "network-side authentication parameters") from the authentication sessions monitored on the network-side interface, and second sets of authentication parameters (referred to herein as "air-interface authentication parameters") from the authentication sessions monitored on the air interface.

A processor in the monitoring system establishes correlations between sets of network-side authentication parameters and corresponding sets of air-interface authentication parameters. Based on these correlations, the processor constructs full sets of parameters needed for decrypting encrypted traffic exchanged between the terminals and the network.

In a typical flow, the monitoring system constructs a database of sets of network-side authentication parameters using network-side monitoring. Each set of network-side authentication parameters originates from a respective authentication session and is associated with the International Mobile Station Identity (IMSI) of the terminal involved in the session. (A terminal may have two sets of authentication keys—One for packet traffic and the other for voice and short messaging.) In order to start decrypting the traffic of a given terminal, the system obtains the off-air authentication parameters of that terminal using off-air monitoring, and finds an entry in the database that matches the air-interface authentication parameters. From the combination of correlated network-side and off-air authentication parameters, the processor is able to extract the parameters needed for decryption.

Several examples of combined network-side and off-air monitoring schemes are described in detail below. The methods and systems described herein are entirely passive, and can be implemented either in real-time or near-real-time monitoring, or in off-line analysis. The disclosed techniques, however, are not limited to passive monitoring and can also be used in active monitoring systems, as well. In some embodiments, the system can use the above-described correlation scheme to map the currently-active terminal IMSIs, without necessarily decrypting or decoding traffic content.

System Description

FIG. 1 is a block diagram that schematically illustrates a combined network-side and off-air monitoring system 20, in accordance with an embodiment that is described herein. System 20 monitors traffic that is exchanged between wireless terminals 24 and a wireless communication network 28. Terminals 24 may comprise, for example, mobile phones, mobile computing devices or any other suitable type of terminals. Terminals 24 are also referred to herein as User Equipment (UE).

In the example of FIG. 1 and in the description that follows, network 28 operates in accordance with the 3GPP UMTS specifications. In alternative embodiments, however, the disclosed techniques can be used for monitoring any other suitable type of wireless network that involves authentication and encryption, such as GSM or LTE networks.

Wireless network 28 comprises various network-side elements. In the present example the network-side elements comprise one or more base stations 32 (also referred to as NodeB or NB), one or more Radio Network Controllers (RNC) 36, one or more Mobile Switching Centers (MSC) 40, one or more Serving GPRS Support Nodes (SGSN) 44, and a Home Location Register (HLR) 48. In alternative embodiments, network 28 may have any other suitable configuration and any other suitable types and numbers of network-side elements.

In the embodiment of FIG. 1, monitoring system 20 comprises a core network interface 52 and a radio network interface 60. Interface 52 monitors one or more wired (as opposed to wireless) interfaces 56 between network-side elements of network 28. In the present example, interface 52 monitors the interface between HLR 48 and MSC 40, and the interface between HLR 48 and SGSN 44. In alternative embodiments, other suitable network-side interfaces may be monitored.

Interface 60 monitors the air interface between UEs 24 and NBs 32, using an antenna 64. Interface 60 typically comprises suitable Radio Frequency (RF) circuitry and modem circuitry for receiving and demodulating traffic from the air interface.

In some embodiments, system 20 further comprises a processor 68 that carries out the methods described herein. Among other tasks, processor 68 uses interface 52 to monitor authentication sessions exchanged over wired interfaces 56 of network 28, and uses interface 60 to monitor authentication sessions exchanged over the air interface between UEs 24 and network 28. Processor 68 stores authentication parameters that are extracted from the monitored authentication sessions, as well as other relevant information, in a database (DB) 72.

In some embodiments, processor 68 correlates authentication parameters obtained using the two types of interfaces (wired and off-air), so as to reconstruct parameter sets that enable encryption of decrypted traffic exchanged with UEs 24. Such correlation methods are explained in detail below. Processor 68 may use the reconstructed parameters for decrypting communication sessions of UEs 24, e.g., sessions monitored using interface 60.

The configuration of system 20 shown in FIG. 1 is an example configuration that is chosen purely for the sake of conceptual clarity. In alternative embodiments, any other suitable system configuration can be used. For example, the partitioning of system 20 into elements can be performed in any other suitable way. The division of functions among interfaces 52 and 60 and processor 68 may differ from the examples described herein.

Certain elements of system can be implemented using hardware, such as using one or more Application-Specific Integrated Circuits (ASICs), Field-Programmable Gate Arrays (FPGAs) or other device types. Additionally or alternatively, certain elements of system can be implemented using software, or using a combination of hardware and software elements.

Database 72 may be implemented using any suitable memory or storage device, e.g., HDD, SSD or other non-volatile storage medium, and/or a suitable volatile memory such as Random Access Memory (RAM). In a typical implementation, database 72 is implemented in-memory, in order to support high rates of UPDATE operations that involve authentication key generation.

Typically, processor 68 comprises one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Example Authentication Process Overview

Typically, at least some of the communication traffic exchanged between UEs 24 and network 28 is encrypted. Encryption keys for encrypting and decrypting traffic are typically derived from a seed (sometimes referred to as secret key) stored only in HLR 48 and in the Subscriber Identity Module (SIM) of the UE. Nevertheless, system 20 uses the combined network-side and off-air monitoring to reconstruct the set of parameters (typically the encryption and integrity keys) needed for decryption. These techniques use the fact that these parameters are also used in the authentication process between the UEs and the network.

Figure 2:
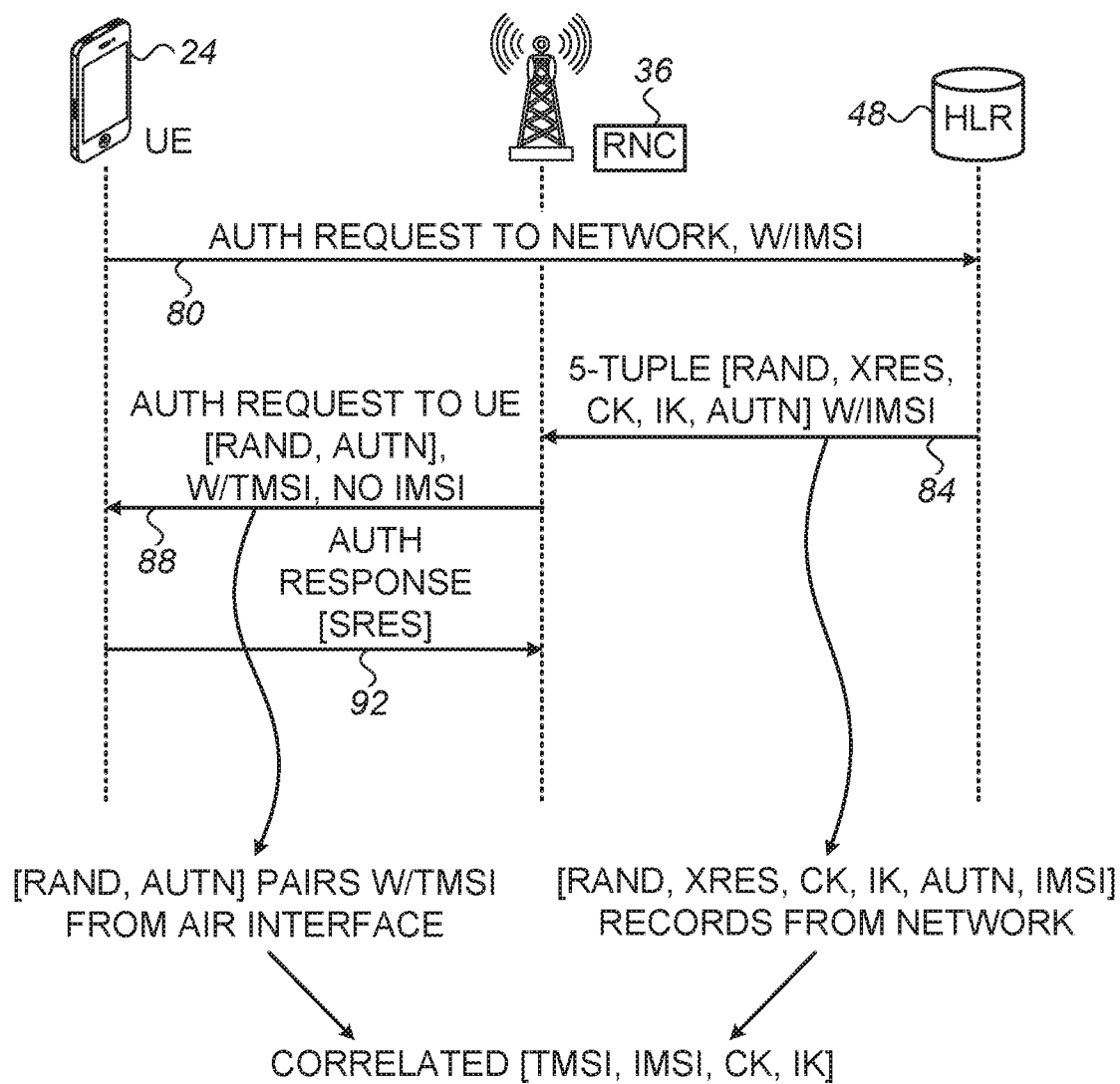
FIG. 2 is a diagram that schematically illustrates a process of correlating authentication parameters obtained using network-side and off-air monitoring, in accordance with an embodiment that is described herein.

FIG. 2 is a diagram that schematically illustrates a process of correlating authentication parameters obtained using network-side and off-air monitoring, in accordance with an embodiment that is described herein. The description that follows starts with a brief overview of the mutual authentication process between UE 24 and network 28, in accordance with the UMTS specifications. The disclosed network monitoring methods are described further below.

In network 28, the authentication mechanism uses a permanent Secret key denoted Ki. Ki is stored only in the SIM of UE 24 and in HLR 48, and is not transferred elsewhere. Other keys in the authentication process are temporary keys that typically change from one session to another. When a certain UE 24 registers with network 28, the network and the UE carry out a mutual challenge-and-response process in which network 28 verifies the authenticity of UE 24, and vice versa. The endpoints of this process are UE 24 and HLR 48.

An authentication session begins with UE 24 sending a network authentication request 80, which indicates the International Mobile Station Identity (IMSI) of the UE, to network 28. The UE sends request 80 to its serving NB 32, and the request is forwarded via RNC 36 to HLR 48.

In response to request 80, HLR 48 generates a set of authentication parameters based on the master key Ki of the UE (stored in advance in the HLR) and the IMSI of the UE (provided in request 80). The set of parameters is referred to as a 5-tuple, and comprises the following parameters:
A random challenge parameter (RAND).
An expected response (XRES).
A Cipher Key (CK).
An Integrity Key (IK).
A user authentication token (AUTN).

HLR 48 responds to request 80 by sending the 5-tuple to RNC 36 in a response 84. RNC 36 sends a subset of the 5-tuple, namely the RAND and AUTN parameters, to UE 24 in a user authentication request 88. Note that the temporary keys CK and IK are not transmitted over the air interface. The IMSI of UE 24 is also omitted from request 88. Instead, request 88 comprises a Temporary Mobile Station Identity (TMSI) that is assigned for the specific session.

Upon receiving request 88, terminal 24 uses the received RAND, together with the Ki stored in its SIM, to compute a respective AUTN. The UE verifies the authenticity of the network by comparing the AUTN received in request 88 with the AUTN derived locally at the UE. If the two AUTN values are the same, the UE may conclude that network 28 is trustworthy.

Assuming network authentication was successful, UE 24 responds to request 88 by sending an authentication response 92 to RNC 36. In response 92 the UE sends a response parameter denoted SRES. SRES is generated in the UE from RAND and Ki using the same function that HLR 48 used for generating XRES.

RNC 36 verifies the authenticity of UE 24 by comparing SRES (sent by the UE in response 92) with XRES (sent by the HLR in response 84). If the two values match, the RNC may conclude that the UE is trustworthy, and the mutual authentication process ends successfully.

The authentication process described above is depicted purely by way of example. In alternative embodiments, the methods and systems described herein can be used with any other suitable authentication process. In GSM networks, for example, the authentication parameters form a triplet (RAND, SRES and Kc) rather than a 5-tuple. In the context of the present patent application and in the claims, the term "authentication parameters" is used to describe any suitable set of parameters whose knowledge enables successful authentication. Parameters such as IMSI and TMSI are also regarded as authentication parameters in this context.

Correlation of Authentication Parameters Obtained
Via Network-Side and Off-Air Monitoring In some embodiments, monitoring system 20 monitors authentication sessions conducted between UEs 24 and wireless network 28. In particular, network-side interface 52 monitors responses 84 in which the HLR sends [RAND, XRES, CK, IK, AUTN] 5-tuples, and off-air interface 60 monitors UE authentication requests 88 in which network 28 transmits [RAND, AUTN] pairs to UE 24.

The two types of monitoring actions (network-side and off-air) are typically performed independently of one another. In other words, there is usually no a-priori correlation indicating that a certain [RAND, XRES, CK, IK, AUTN] 5-tuple and a certain [RAND, AUTN] pair were sent as part of the same authentication session. For example, core network interface 52 and radio network interface 60 may be geographically separate.

In some embodiments, processor 68 of system 20 establishes correlations between the authentication parameter sets obtained via network-side and off-air monitoring. Processor 68 typically establishes the correlations using the RAND and AUTN parameters, which appear both in the 5-tuples obtained on the network side and in the [RAND, AUTN] pairs obtained from the air interface.

Figure 3:
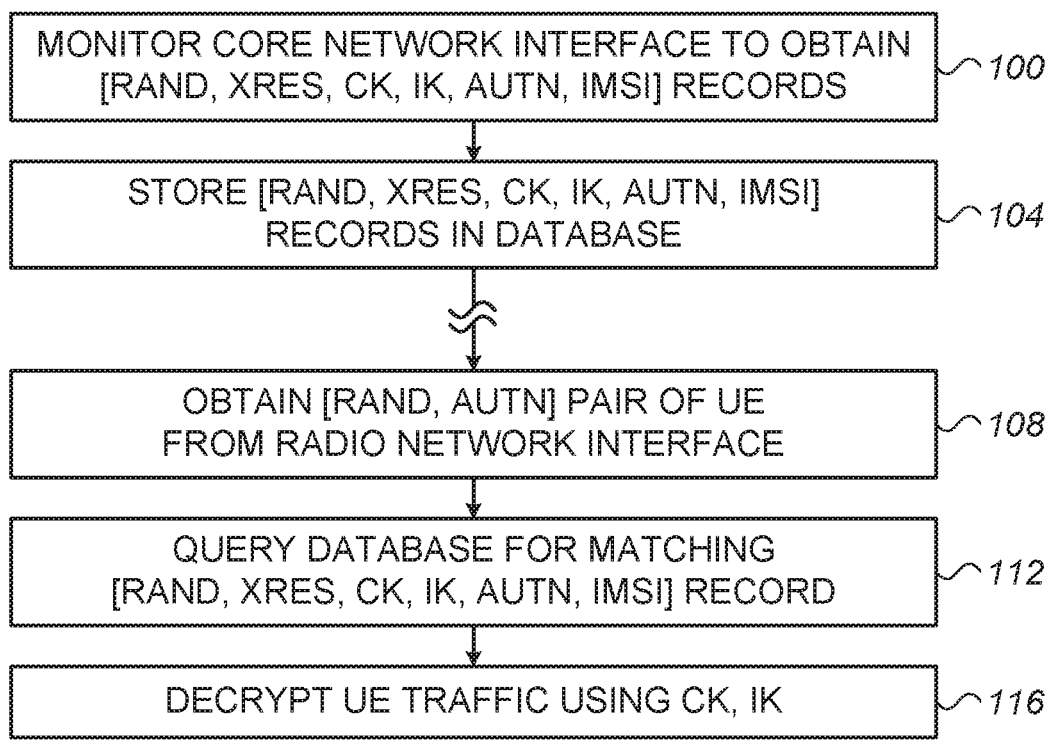
FIG. 3 is a flow chart that schematically illustrates a method for combined network-side and off-air monitoring, in accordance with an embodiment that is described herein.

FIG. 3 is a flow chart that schematically illustrates a method for combined network-side and off-air monitoring, in accordance with an embodiment that is described herein. The method begins with system 20 monitoring wired interfaces 56 in network 28 using interface 52, so as to obtain [RAND, XRES, CK, IK, AUTN] 5-tuples and the corresponding IMSIs, at a network-side monitoring step 100.

Processor 68 (or interface 52 directly) stores the collected [RAND, XRES, CK, IK, AUTN, IMSI] records in database 72, at a database construction step 104. Database 72 gradually develops to contain a large number of [RAND, XRES, CK, IK, AUTN, IMSI] records pertaining to multiple authentication sessions conducted with various UEs 24.

At a certain point in time, system 20 may be required to decrypt the encrypted traffic of a certain UE 24. The requirement may originate, for example, from the need to recognize the type of application used by the UE in order to provide it with the appropriate QoS, or for any other reason.

In order to decrypt the traffic of the UE in question, system 20 monitors the authentication session between the UE and the network on the air interface using interface 108, at an off-air monitoring step 108. Processor 68 extracts the [RAND, AUTN] pair and the corresponding TMSI value from the monitored session.

At a correlation step 112, processor 68 queries database 72 for a [RAND, XRES, CK, IK, AUTN, IMSI] record, which has RAND and AUTN values that match the [RAND, AUTN] pair obtained from the air interface at step 108 above. Assuming that a matching record is found in the database, processor 68 now possesses a correlation between the CK, IK and IMSI of the UE, and between the TMSI assigned to this UE for the current session.

Using this correlation, processor 68 decrypts the downlink and/or uplink traffic exchanged with the UE, at a decryption step 116. All traffic associated with the UE in the current session is addressed with the TMSI value, and, since processor 68 possesses the correct CK and IK values for this TMSI, it is able to decrypt the traffic.

The flow of operations shown in FIG. 3 is an example flow, which is depicted purely for the sake of conceptual clarity. In alternative embodiments, any other suitable flow can be used. For example, the phase of constructing database 72 using network-side monitoring (steps 100-104) may overlap the off-air monitoring and correlation process (steps 108-116). In other words, steps 100-104 may be performed continually so as to update the database, irrespective of (and possibly concurrently with) correlation and decryption operations performed using the database.

In various embodiments, the method of FIG. 3 may be performed in near-real-time or off-line. In an example off-line implementation, system 20 constructs database 72 and also records multiple authentication sessions from the air interface. In other words, steps 100-108 are performed in advance. All of the collected information is stored on suitable storage, and processor 68 performs the correlation and decryption operations (steps 112-116) at a later time.

In an example near-real-time implementation, system 20 comprises suitable buffer storage for buffering traffic obtained from the air interface. Typically, an entire UMTS carrier is buffered, including both authentication sessions and user traffic of various UEs. The buffering operation provides processor 68 with a non-delayed replica and a delayed replica of the UMTS carrier traffic. Processor 68 uses the non-delayed replica of the traffic to obtain the parameters needed for decryption (steps 100-112), and then uses these parameters to decrypt the user traffic in the delayed (buffered) replica. This sort of implementation enables system 20 to perform near-real-time decryption of traffic, and also to compensate for possible geographical separation between core network interface 52 and radio network interface 60.

In an alternative embodiment, system 20 does not decrypt the traffic, but rather uses the correlations obtained at step 112 to monitor one or more UEs 24 using their respective TMSIs. For example, system 20 may use the correlations to map the IMSIs (and thus the UE identities) that are active at a given time at a given geographical area. The correlation is needed because, after authentication, subsequent traffic carries only the TMSI and not the IMSI value. Step 112 obtains a correlation between the unique permanent IMSI of each UE (used during authentication) and the TMSI that was assigned temporarily and used in subsequent traffic.

In some practical scenarios, system 20 is required to decrypt the encrypted traffic of a certain UE 24 even though no off-air authentication parameters are available. For example, in a certain scenario, authentication sessions are rare, and system 20 needs to decrypt the encrypted traffic before encountering the next authentication session. In such cases, processor 68 of system 20 may search exhaustively over the keys ([RAND, XRES, CK, IK, AUTN, IMSI] records) stored in database 72 in an attempt to find a key that successfully decrypts the data.

In an embodiment, processor 68 may remove irrelevant keys from the exhaustive search. For example, processor 68 may remove keys that were issued after system 20 started monitoring. In an embodiment, system 20 may obtain side information that assists in removing irrelevant keys from the exhaustive search. For example, by monitoring additional network-side interfaces, system 20 may enrich the ([RAND, XRES, CK, IK, AUTN, IMSI] records with geographical information, e.g., the Visitor Location Register (VLR), Location Area Code (LAC) and/or cell in which the terminal holding the corresponding session was located. This geographical information enables processor 68 to narrow-down the list of keys that should be searched exhaustively.

In some embodiments, the keys used for decryption by system 20 are not the initial keys formed by correlating the off-air and network-side authentication parameters, but rather subsequent keys that are derived from the initial keys using known key-derivation functions. In LTE, for example, the UE and the network derive multiple types of keys, for use in different network elements on the network side, from the same [CK, IK] pair. In system 20, once CK and IK are discovered using the disclosed techniques, processor 68 may derive the subsequent keys by applying the same key-derivation functions used by the UE and the network.

Although the embodiments described herein mainly address network monitoring, the principles of the present disclosure can also be used for other applications such as monitoring test equipment and communication interception systems.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for network monitoring, comprising:
   receiving, by a monitoring system, first sets of authentication parameters exchanged between wireless communication terminals and a wireless network, by monitoring an air interface between the terminals and the wireless network using a radio network interface;
   receiving, by the monitoring system, second sets of authentication parameters exchanged between the terminals and the wireless network, by monitoring at least one wired interface between network side elements of the wireless network using a core network interface;

establishing, by the monitoring system, one or more correlations between the first sets and the second sets;

determining, by the monitoring system, a type of application associated with a wireless terminal of the wireless terminals based on the established one or more correlations between the first sets and the second sets; and providing, by the monitoring system, a quality of service to the wireless terminal of the wireless terminals according to the determined type of application.

2. The method according to claim 1, wherein establishing the one or more correlations comprises identifying one or more authentication parameters that appear in one of the first sets and in one of the second sets.

3. The method according to claim 1, wherein establishing the one or more correlations comprises identifying a first set of authentication parameters obtained from an air interface and a second set of authentication parameters obtained from a wired interface that both pertain to a given terminal.

4. The method according to claim 3, wherein establishing the correlation comprises concluding that a Temporary Mobile Station Identity (TMSI) in the first set and an International Mobile Station Identity (IMSI) in the second set both pertain to the given terminal.

5. The method according to claim 4, further comprising monitoring the given terminal using the TMSI.

6. The method according to claim 1, wherein receiving the first sets comprises storing the first sets in a database, and wherein establishing the correlations comprises, for a given second set, querying the database for a first set that matches the given second set.

7. The method according to claim 1, further comprising:
storing traffic to create a first replica of the traffic and a second replica of the traffic, wherein the first replica of the traffic and the second replica of the traffic both include user traffic;
obtaining parameters needed for decryption of the user traffic from the first replica of the traffic; and
using the obtained parameters from the first replica of the traffic to decrypt the user traffic from the second replica of the traffic.

8. The method of claim 1, wherein receiving the first sets of authentication parameters comprises monitoring an air interface between the terminals and the wireless network using a radio network interface, and wherein the first sets of authentication parameters comprise Temporary Mobile Station Identities (TMSIs) of the wireless communication terminals that are active at a given geographic area.

9. The method of claim 1, wherein receiving the second sets of authentication parameters comprises monitoring at least one wired interface between network-side elements of the wireless network using a core network interface, wherein the radio network interface and the core network interface are geographically separate, and wherein the second sets of authentication parameters comprise International Mobile Station Identities (IMSIs).

10. A system for network monitoring, comprising:
a radio network interface, which is configured to monitor an air interface between wireless communication terminals and a wireless network;
a core network interface, which is configured to monitor at least one wired interface between network-side elements of the wireless network; and
a processor, which is configured to:
receive using the first interface first sets of authentication parameters exchanged between the terminals and the wireless network;
receive using the at least one wired interface second sets of authentication parameters exchanged between the terminals and the wireless network;
establish one or more correlations between the first sets and the second sets;
determine a type of application associated with a wireless terminal of the wireless terminals based on the established one or more correlations between the first sets and the second sets;
provide a quality of service to the wireless terminal of the wireless terminals according to the determined type of application.

11. The system according to claim 10, wherein the processor is configured to establish the one or more correlations by identifying one or more authentication parameters that appear in one of the first sets and in one of the second sets.

12. The system according to claim 10, wherein, by establishing the correlation, the processor is configured to conclude that a Temporary Mobile Station Identity (TMSI) in the first sets and an International Mobile Station Identity (IMSI) in the second sets both pertain to the given terminal.

13. The system according to claim 10, wherein the processor is configured to store the first sets in a database, and to establish a correlation for a given second set of the second sets, by querying the database for a first set of the first sets that matches the given second set.

14. The system according to claim 10, wherein the processor is configured to:
store traffic received to create a first replica of the traffic and a second replica of the traffic, wherein the first replica of the traffic and the second replica of the traffic both include user traffic;
obtain parameters needed for decryption of the user traffic from the first replica of the traffic; and
use the obtained parameters from the first replica of the traffic to decrypt the user traffic from the second replica of the traffic.

15. The system according to claim 10, wherein the first sets of authentication parameters comprise Temporary Mobile Station Identities (TMSIs) of the wireless communication terminals that are active at a given geographic area.

16. The system according to claim 10, wherein the radio network interface and the core network interface are geographically separate, and wherein the second sets of authentication parameters comprise International Mobile Station Identities (IMSIs.

17. A non-transitory computer readable medium comprising instructions that, when executed by the at least one processor, cause the system to:
receive first sets of authentication parameters exchanged between wireless communication terminals and a wireless network, by monitoring an air interface between the terminals and the wireless network using a radio network interface;
receive second sets of authentication parameters exchanged between the terminals and the wireless network, by monitoring at least one wired interface between network side elements of the wireless network using a core network interface;
establish one or more correlations between the first sets and the second sets;
determine a type of application associated with a wireless terminal of the wireless terminals based on the established one or more correlations between the first sets and the second sets; and provide a quality of service to the wireless terminal of the wireless terminals according to the determined type of application.

18. The system according to claim 17, wherein receiving the first and second sets comprises monitoring authentication sessions conducted between the terminals and a Home Location Register (HLR) of the wireless network.

\* \* \* \* \*